United States Patent [19]
Boni et al.

[11] Patent Number: 5,593,520
[45] Date of Patent: Jan. 14, 1997

[54] RING DEVICE FOR RUNNING ON A FLAT TIRE

[75] Inventors: Bernard Boni; Eric Carpentier, both of Champagne-Sur-Oise; Laurent Babillon, Paris, all of France

[73] Assignee: Hutchinson, Paris, France

[21] Appl. No.: 500,444

[22] Filed: Jul. 10, 1995

Related U.S. Application Data

[63] Continuation of Ser. No. 157,229, Nov. 23, 1993, abandoned.

[30] Foreign Application Priority Data

Dec. 3, 1992 [FR] France ................. 92 14561

[51] Int. Cl.⁶ .................................. B60C 17/04
[52] U.S. Cl. ............................ 152/158; 152/520
[58] Field of Search ................... 152/520, 158, 152/152, 516

[56] References Cited

U.S. PATENT DOCUMENTS

| | | | |
|---|---|---|---|
| 796,167 | 8/1905 | Waite | 152/152 |
| 2,262,780 | 11/1941 | Sherwood | 152/158 |
| 3,528,472 | 9/1970 | Kubach . | |
| 4,461,333 | 7/1984 | Filliol et al. | 152/158 |
| 5,186,771 | 2/1993 | Carpentier et al. | 152/158 |

FOREIGN PATENT DOCUMENTS

| | | |
|---|---|---|
| 123695 | 11/1984 | European Pat. Off. . |
| 430743 | 6/1991 | European Pat. Off. . |
| 430994 | 10/1911 | France . |
| 1560299 | 3/1969 | France . |
| 2610249 | 8/1988 | France . |
| 135791 | 8/1901 | Germany . |
| 254410 | 10/1989 | Japan ................. 152/520 |

*Primary Examiner*—Geoffrey L. Knable
*Attorney, Agent, or Firm*—Bell, Seltzer, Park & Gibson, P.A.

[57] ABSTRACT

The improved ring device for running on a flat tire for a vehicle wheel that is provided with a tubeless tire mounted on a one-piece rim having a well-base is constituted by a one-piece split ring received inside the tire and designed to fit over at least a portion of the shape of the rim. The ring is formed with a reinforced thermoplastic resin core having a rubber annular projecting portion thereon, and it is fitted with means for fastening together the end portions of the ring and for tightening them onto the rim.

15 Claims, 4 Drawing Sheets

RING DEVICE FOR RUNNING ON A FLAT TIRE

This application is a file wrapper continuation of application Ser. No. 08/157,229, filed Nov. 23, 1993, now abandoned.

FIELD OF THE INVENTION

The present invention relates to an improved ring device for running on a flat tire for a vehicle wheel that is provided with a tubeless tire mounted on a one-piece rim having a well-base or a drop center, the device being received in said tire and fitting over at least a fraction of the shape of the rim, the outer surface of said ring being at a distance from the inner surface of the tire tread so long as the tire in its normal operating condition, said device being of the type whose portion that is designed to come into contact with the well of the rim comprises an abutment lip for holding a bead of the tire whose other bead is subjected to force from a wedge provided on the diametral face of the ring opposite to that which carries the abutment lip.

BACKGROUND OF THE INVENTION

In general, devices for running on a flat tire are devices which serve, when placed inside a tubeless pneumatic tire mounted on a wheel rim, to enable vehicles whose wheels are fitted therewith to continue to run in satisfactory manner in the event of partial or total loss of inflation pressure in the tire. One application for such devices is to be fitted to the wheels of vehicles that are required to travel in zones where traffic is difficult or dangerous and in which a degree of mobility must be conserved under all circumstances, regardless of whether the loss of tire pressure is accidental or has been provoked deliberately.

The conditions that such devices need to satisfy are both severe and contradictory. In the event of a puncture or even of a partial loss of inflation pressure in a tire, it is important:

to prevent the beads of the tire coming off their seats on the rim, regardless of whether the rim is of the flat type, is demountable or not, or is a well-based rim or a drop-center rim;

to limit the collapse of the tire;

to prevent the tire tread being damaged too quickly by pinching where it comes into contact with the device; and to conserve the best possible shock-absorbing characteristics for the wheels.

A ring device of the type specified above is described in document FR-A-2 654 989 where the ring is constituted by an assembly of a plurality of arcuate sectors provided with coupling means at each of their ends. The ring is made of a composite material based on a reinforced thermoplastic resin, the lip of the abutment for holding the bead of the tire is integral with each of the ring sectors, and the wedge for holding the other bead of the tire is made of elastomer and is fixed on the sectors.

In general, such a ring device for running on a flat tire suffers from two types of drawbacks in particular. The first type of drawbacks lies in the use of a material that is very rigid and that may cause the tire to puncture in the event of a frontal shock, e.g. against a curb stone, thereby causing the tire cover to come into contact with the ring. Given the way the device is mounted inside the tire, this rigidity of its material also implies that the ring must be made up of a plurality of sectors. The second type of drawbacks lies in assembly and disassembly operations which are lengthy, which require the use of qualified operatives, and which imply the use of special tools. Such a device is also expensive.

OBJECTS AND SUMMARY OF THE INVENTION

Consequently, a general object of the present invention is to provide an improved ring device for running on a flat tire, which is simple, easy to mount and dismount without specialized tooling, and which is sufficiently flexible to avoid puncturing the tire in the event of a shock.

Another object of the invention is to provide such a device which makes it possible to limit collapse of the tire in the event of a puncture so as to avoid rapid deterioration of the side walls of the tire and which allows the vehicle to run for several tens of kilometers while still keeping the tire on the wheel.

Another object of the invention is to provide such a device which is suitable for withstanding the load of the vehicle under the best possible conditions while running on a flat, without shearing the tread of the tire by applying too great a pressure thereto and without premature damage appearing because of internal heating.

Another object of the invention is to provide such a device which is sufficiently flexible to avoid generating large amounts of mechanical vibrations while running on a flat tire, thereby ensuring that the vehicle can be driven under good conditions of safety in spite of a tire fitted with the device being punctured.

Finally, an object of the invention is to provide such a device that is suitable for fitting to the wheels of civilian or military vehicles that are in danger of being shot at, i.e. to provide a device that is as insensitive as possible to impact from a bullet.

According to the invention, all of these objects are achieved by a ring device of the above-specified type to enable a vehicle to run on a wheel having a flat tire, wherein the ring is constituted by a single piece that is split at a point on its circumference so as to present two end portions that are movable relative to each other, said ring including a core of composite material based on a reinforced thermoplastic resin, and an annular projecting portion of rubber being bonded to the core, the outer peripheral surface of the projecting portion forming the outer surface of said ring, and the end portions being held together by means of mechanical fastenings designed to tighten the ring onto the rim of the wheel.

According to another feature of the invention, the abutment lip for holding a bead of the tire is integral with the core of the ring and is made of the same material as the core.

According to another feature of the invention, the wedge for exerting a compression force on the other bead of the tire is made of rubber and may be integral with the projecting portion of the ring, the projecting portion and the wedge being made, for example, from a very tough polyisoprene having hardness of about 70 on the Shore A scale.

In a variant, the wedge may be made of a more flexible rubber and may be integrated in the projecting portion during the molding process.

In an embodiment of the invention, the mechanical fastenings for holding the end portions of the ring together comprise a cable situated substantially in the diametral plane of the ring and embedded therein, two externally-threaded sleeves crimped to respective ones of the two free ends of the cable and projecting into the split of the ring, and a nut screwed onto both sleeves, the ring including an access window opening out into said split for the purpose of passing a tool for turning the nut.

In addition to its use in installing and holding the ring on the rim, the cable which may be made of steel, for example, serves in particular to withstand traction forces due to the centrifuging of the ring inside the tire.

The nut of the fastening means is of a certain length so as to enable the clamping of the ring on the rim to be adjusted, and so as to compensate for differences in diameter that may be encountered on any given type of wheel.

In a second embodiment of the invention, the mechanical fasteners for holding the end portions of the annular element together comprise solely a bolt of a special type and a driving nut secured to the shank of the bolt.

BRIEF DESCRIPTION OF THE DRAWINGS

Other advantages, features, and details of the invention appear from the following explanatory description made with reference to the accompanying drawings, given purely by way of example, and in which.

MORE DETAILED DESCRIPTION

A ring device 1 of the invention for running on a flat tire and as shown in the various figures is designed to be received inside a tubeless pneumatic tire 2 that is mounted on a wheel rim 3.

Figure 1:
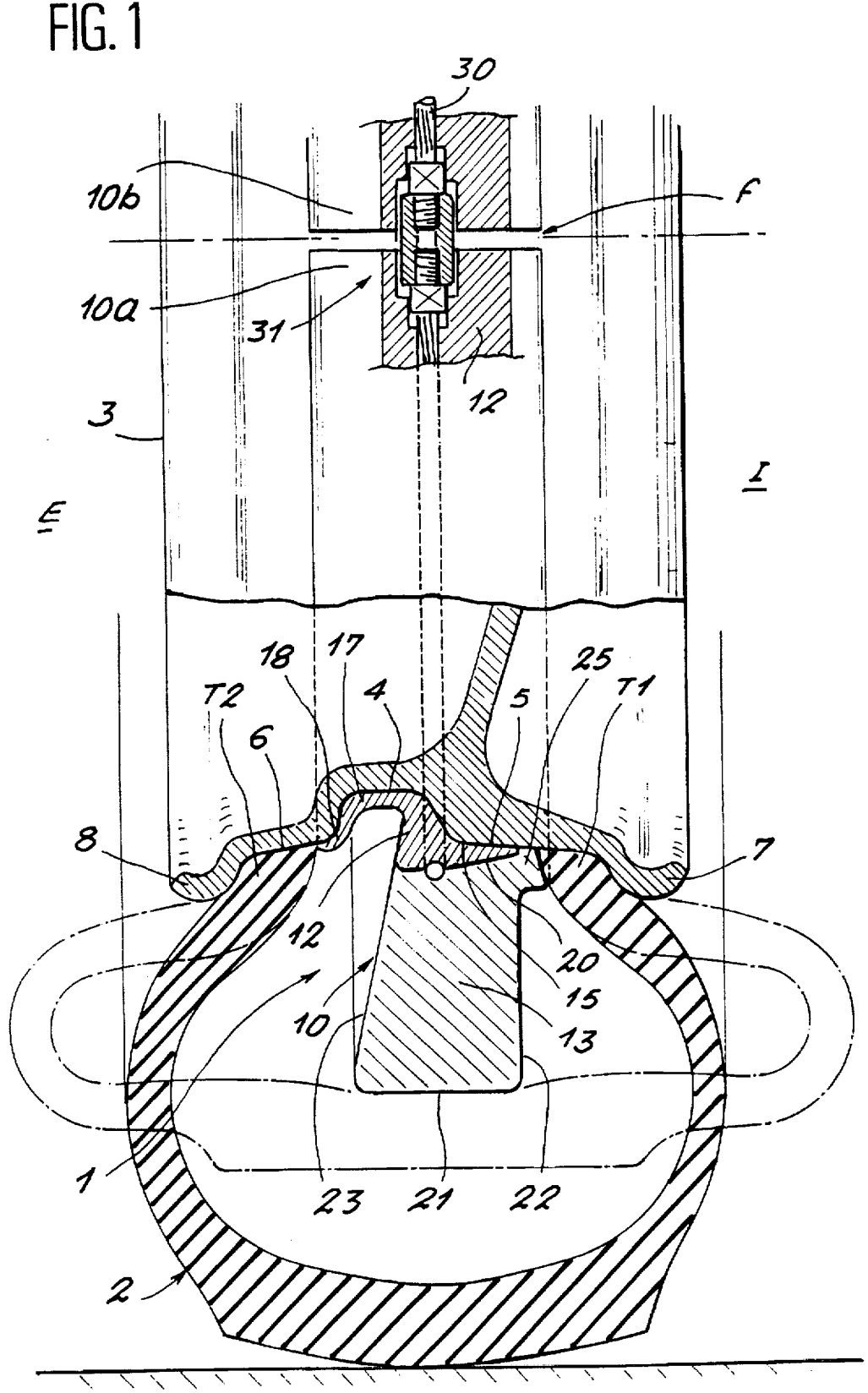
FIG. 1 is a radial section through a portion of a wheel fitted with a device of the invention.
Figure 2:
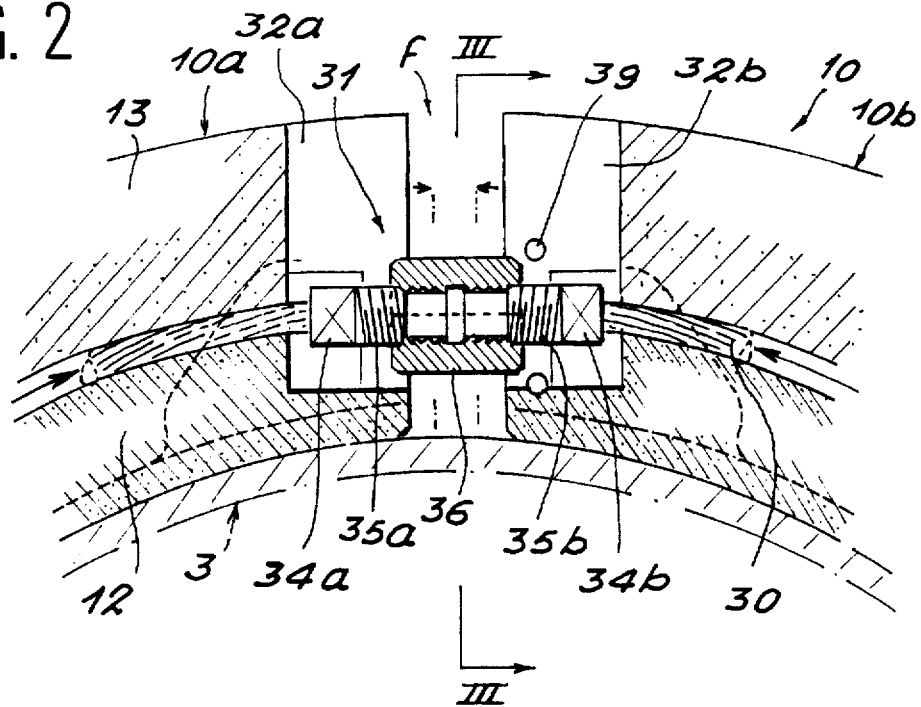
FIG. 2 is a side view seen on arrow F2 of FIG. 1.
Figure 3:
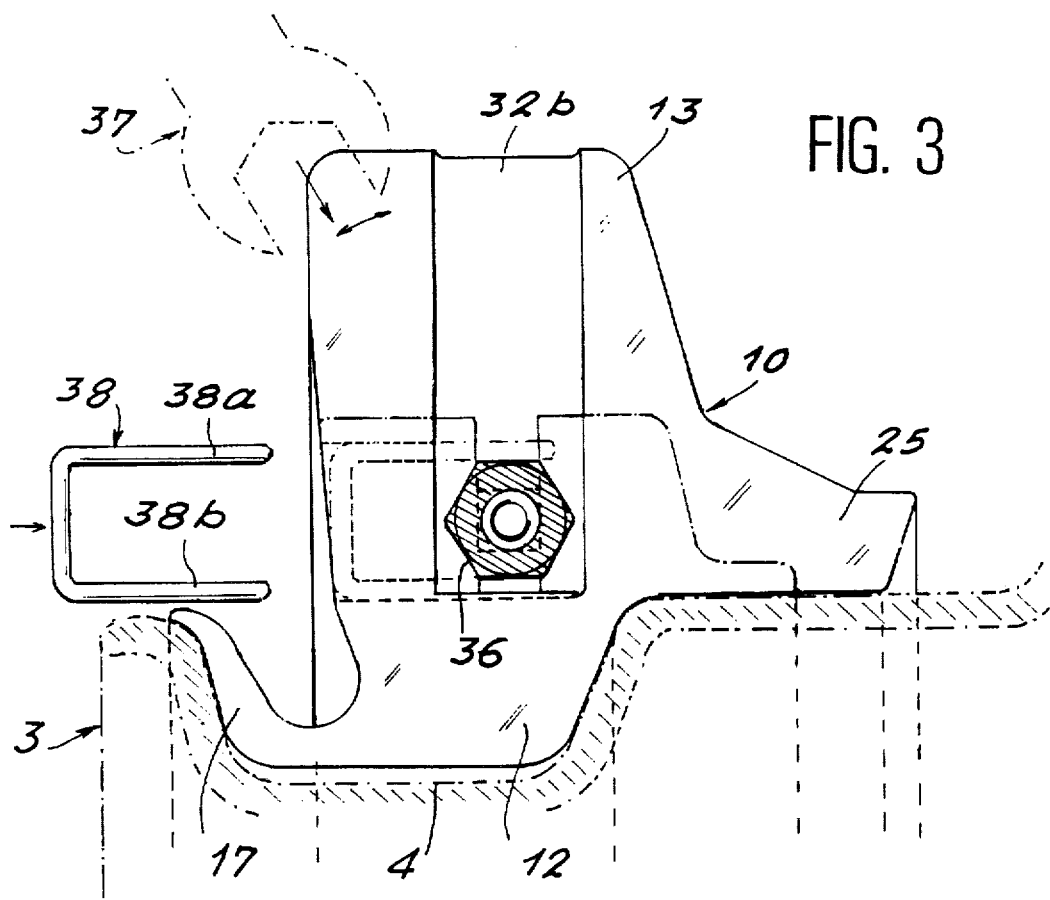
FIG. 3 is a section view on line III—III of FIG. 2.

In the embodiment shown in FIGS. 1 to 3, the rim 3 is of the one-piece type and it includes a well-base or drop center 4 adjacent to and between a first generally frustoconical portion 5 on the inside I of the wheel and a second frustoconical portion 6 on the outside E of the wheel. The external edges of the frustoconical portions 5 and 6 are lined by respective shoulders 7 and 8 that serve as abutments for the beads T1 and T2 of the tire 2.

The ring device 1 is constituted by a one-piece ring 10 split at one point in its circumference so as to have two end portions 10a and 10b that can be moved relative to each other.

The ring 10 is a one-piece assembly constituted by an annular core 12 that is split and that is extended radially outwards by a split annular projecting portion 3, the splits in the core 12 and in the projecting portion 13 coincide with each other so as to form a single split f.

In general, the inner peripheral surface 15 of the core 12 is designed to come into contact with the outer peripheral surface of the rim 3 in the vicinity of the central portion thereof, and consequently its shape is complementary to the shape of the rim 3.

In the example shown in FIGS. 1 to 3, the inner peripheral surface 15 of the core 12 comes into contact with the rim 3 partially by fitting in the well 4 and partially by overlying a fraction of the adjacent frustoconical surface 5 of the rim 3 situated on the inside of the wheel and extending towards the bead T1.

The core 12 extends laterally towards the outside E of the wheel in the form of an annular abutment lip 17 that is split and that is designed to come into contact with the bottom of the well 4 and to overlie a portion of the adjacent frustoconical surface 6 of the rim 3. The free end of said lip forms an abutment 18 for holding the outside bead T2 of the tire 2 and for preventing it moving laterally over the rim 3 while running on a flat tire, thereby improving the ability of the wheel to transmit drive in this configuration and also providing good road holding, while still enabling the tire cover to be removed without damaging the abutment 18.

The annular projecting portion 13 has a right cross-section that is approximately in the shape of a rectangular trapezium and it is defined in the plane of FIG. 1 by an inner edge 20 and an outer edge 21 parallel to the axis of the wheel, by a substantially vertical edge 22 situated on the inside of the wheel, and by a sloping edge 23 such that the width of the projecting portion 13 increases going towards its outer peripheral surface.

The annular projecting portion 13 extends laterally on the inside I of the wheel in the form of an annular extension forming a wedge 25 whose free end surface is slightly conical relative to the axis of the wheel. The dimensions of this wedge 25, and in particular its width measured parallel to the axis of the wheel, are such as to enable it to press against the inside surface of the bead T1 of the tire 2, thereby exerting a compression force on said bead and preventing it from moving laterally over the rim 3 when running on a flat tire. In the embodiment shown, the wedge 25 contacts the rim 3.

In accordance with the invention, the core 12 is made of a composite material based on a thermoplastic resin selected from the family of polyamides sequenced for reaction injection molding (RIM), for example, and it is reinforced with glass fiber reinforcement, thereby providing a material having good strength characteristics in traction and in compression, and very good resistance to fatigue, heating, shocks, and bullet impacts.

The presence of glass fibers as the reinforcement in the composite material of the core 12 makes it possible to obtain an expansion coefficient for the core that is considerably smaller than the coefficient of a thermoplastic resin on its own. The abutment lip 17 is integral with the core 12 of the annular element 10 and it is made of the same material, with the presence of glass fibers as reinforcement in said material making it possible to use smaller right cross-sections for said lip 17 and the portions adjacent thereto, thereby making it easier to mount the device and the tire on the rim.

In accordance with the invention, the annular projecting portion 13 is made, for example, from an elastomer such as very tough polyisoprene having hardness of about 70 on the Shore A scale, and it is bonded to the core 12.

The wedge 25 for holding the other bead T1 of the tire 2 may be integrally formed with the annular projecting portion 13, for example, thus being made of the same material, advantage being taken of the flexibility of the rubber to ensure that the force exerted by compressing the wedge 25 is, so far as possible, independent of the width of the wheel which, by construction, has tolerances on its internal width that are of the order of ±3 mm for wheel diameters of 35.56 cm, 38.10 cm, and 40.64 cm (14", 15", and 16"), and of ±5 mm for diameters of 50.80 cm (20").

In the embodiment shown in FIGS. 1 to 3, the end portions 10a and 10b of the ring 10 are held together by means of a cable 30 and by fastening means 31 for connecting together the two free ends of the cable 30 and for tightening the ring 10 on the rim 3. With reference more particularly to FIG. 2, the cable 30 is situated substantially in the diametral plane of the ring 10 and it is embedded in the ring 10 while the ring is being molded, and the two free ends of the cable project from respective ones of the two free end faces of the ring 10 into an access opening or slot 32a, 32b situated on either side of the split f so as to enable the fastening and clamping means 31 to be installed and operated. In other words, the access slot is split into two portions 32a and 32b provided in respective ones of the two free end faces of the portions 10a and 10b of the ring 10, said slot 32a, 32b opening out into the outer peripheral surface of the ring 10.

The fastening means 31 for connecting together the two free ends of the cable 30 and for tightening the ring 10 onto the rim 3 are constituted:

by two sleeves 34a and 34b fixed, e.g. by crimping, onto respective ends of the cable 30, these two sleeves being received in respective portions 32a and 32b of the slot on either side of the split f, and they are externally threaded with oppositely-handed threads 35a and 35b; and by a nut 36 having two threads 36a and 36b that are respectively complementary to the threads 35a and 35b, and which is screwed onto the two sleeves 34a and 34b.

Thus, depending on the direction in which the nut 36 is turned by means of a wrench 37 inserted in the split f, the two sleeves 34a and 34b move towards each other (tightening) or away from each other (loosening).

The cable 30 which is made of steel, for example, has a diameter of 6 mm, an elastic limit of about 2000 DaN and it is extra-flexible so as to simplify tightening the nut 36.

The nut 36 is long enough to enable tightening of the ring 10 on the rim 3 to be adjusted and to compensate for the differences in diameter that are encountered on different wheels of a given type and also the tolerances in manufacture of the ring 10. Advantageously, the ends of the nut 36 are not threaded over a length of a few millimeters so as to provide preguidance for the sleeves 34a and 34b, thereby facilitating the tightening operation.

To prevent any accidental rotation of the nut 36 once the ring 10 has been installed on the rim 3, which rotation could loosen the ring 10 and cause a harmful unbalance to appear, means are provided for locking the nut 36 against rotation. These means may be constituted, for example, by a U-shaped pin 38 whose two parallel arms 38a and 38b engage in two respective side channels 39 formed in the ring 10 so as to bear against two opposite faces of the nut 36 after it has been tightened.

The way in which the ring device of the invention is installed is immediately apparent from the above description. After the bead T1 has been put into place on the rim 3 in contact with its shoulder 7, the ring 10 is inserted inside the cover of the tire 2. The ring 10 is molded with the cable 30 embedded therein, and the two free ends of the cable 30 are fitted with the sleeves 34a and 34b, and also with the nut 36 so that the two end portions 10a and 10b of the ring 10 are loosely connected together giving the ring a diameter that is greater than the diameter of the rim 3 so as to enable it to be fitted freely around the rim. Thereafter, the ring 10 is tightened so that its inner peripheral surface 15 comes into tight contact with the outer peripheral surface of the rim 3. This is done by turning the nut 36 by means of the wrench 37 so as to cause the free ends of the two sleeves 34a and 34b to move further into the nut 36 thus moving the two end portions 10a and 10b of the ring 10 towards each other. Once the ring 10 is in place, its wedge 35 bears against the inside surface of the bead T1 and the locking pin 38 is inserted into the channels 39 in order to lock the nut 36 against rotation. Finally, the bead T2 of the tire is put into contact with the shoulder 8 of the rim, and with the abutment-forming end 18 of the lip 17 of the ring 10 pressing against the inside surface of the bead T2, after which inflation pressure is applied and the wheel is installed on the vehicle that is to be fitted therewith.

Following a puncture that may be accidental or deliberate, the inside surface of the tire tread comes into contact with the peripheral surface of the projecting portion 13 of the ring 10, as shown in chain-dotted lines in FIG. 1.

Figure 4:
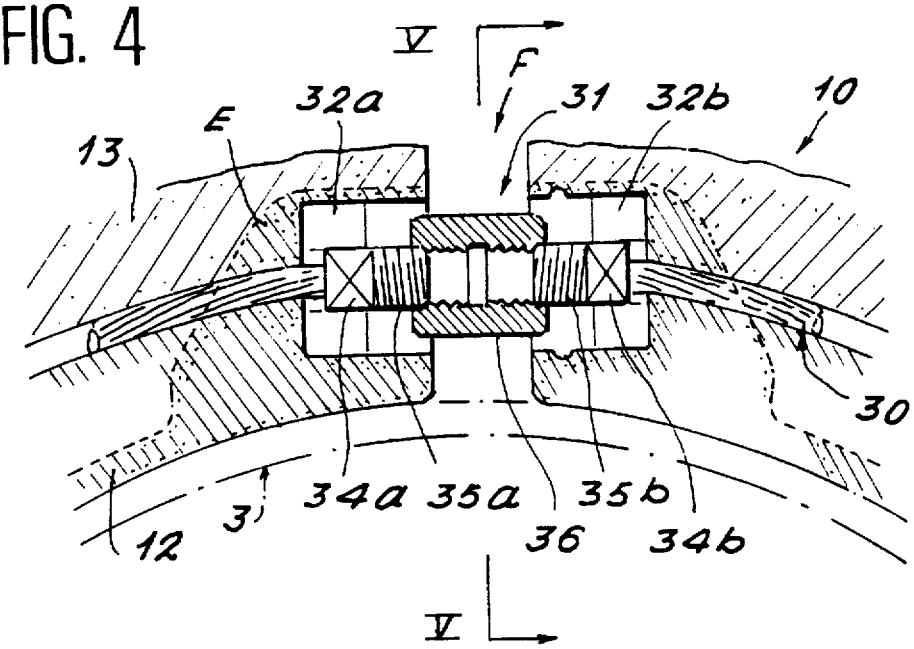
FIG. 4 is a side view similar to FIG. 2, but showing a first variant embodiment.
Figure 5:
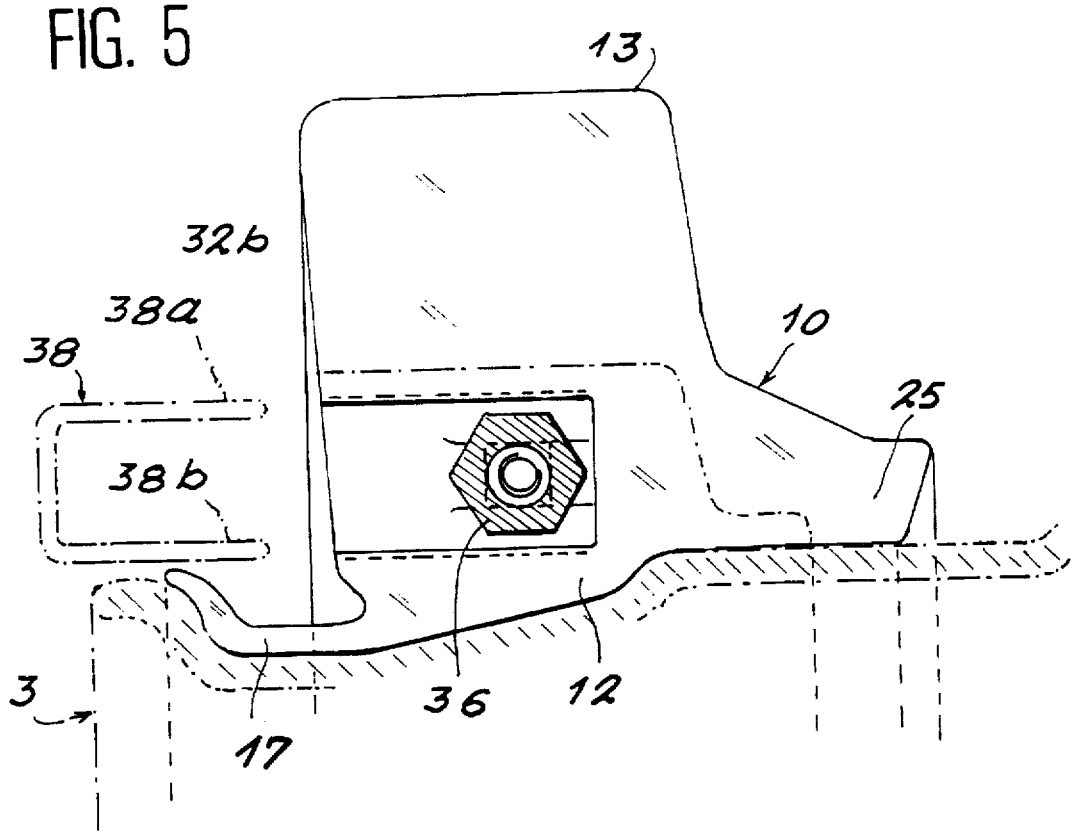
FIG. 5 is a section view on line V—V of FIG. 4.

In a first variant embodiment shown in FIGS. 4 and 5, the slot 32a, 32b that enables the nut 36 to be installed and manipulated is a slot that opens out through the two opposite side faces of the ring 10, and the means 31 for connecting together the two free ends of the cable 30 and for tightening the ring 10 onto the rim 3 are identical to those shown in FIGS. 1 and 3.

Figure 6:
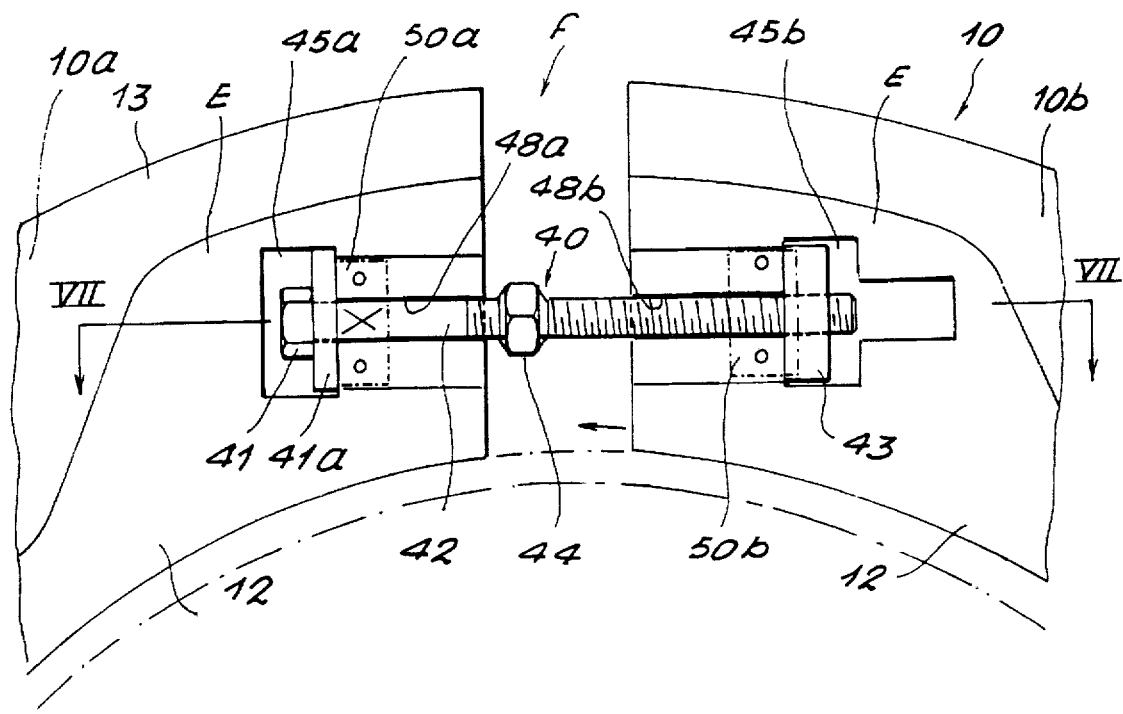
FIG. 6 is a side view similar to FIG. 2, but showing a second variant embodiment, prior to the ring device being tightened onto the wheel rim.
Figure 7:
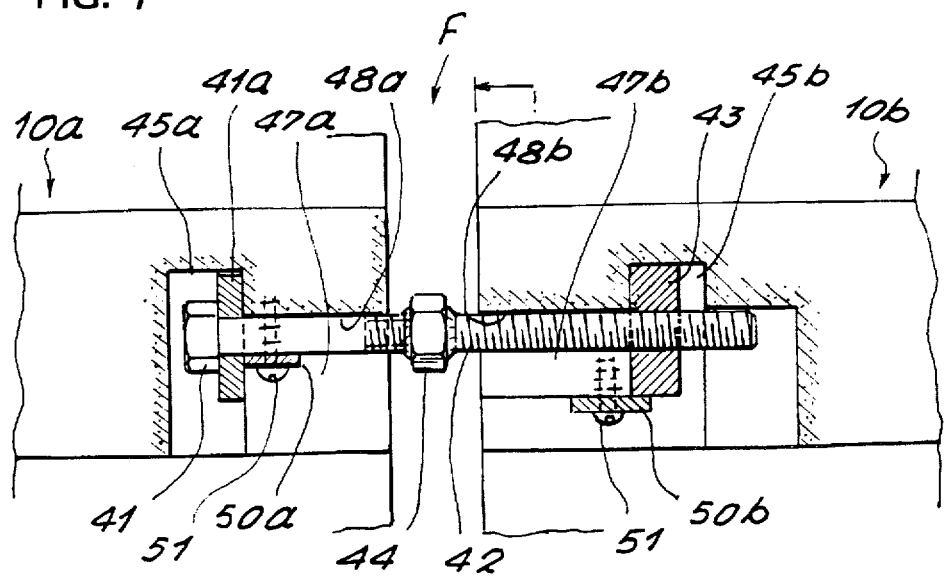
FIG. 7 is a section view on line VII—VII of FIG. 6, after the ring device has been tightened onto the wheel rim.

In a second variant embodiment shown in FIGS. 6 and 7, the means for fastening the two end portions 10a and 10b of the ring 10 together are different in structure and they do not include a cable 30.

These means are constituted by a special type of bolt 40 having a head 41, a threaded shank 42, a nut 43 screwed onto the shank 42, and a driving nut 44 that is welded onto a central portion of the shank 42. The head 41 is designed to be received in a first slot 45a which opens out to a side face of the ring 10, said slot 45a being provided in the end portion 10a of the ring 10. Towards the split f, this first slot 45a is extended by a shallower second slot 47a whose bottom includes a groove 48a for receiving the shank 42.

In similar manner, the same elements are to be found in the end portion 10b of the ring 10, with the same reference numerals followed by the letter b.

The head of the bolt 41 and a washer 41a mounted on the shank 42 are received in the slot 45a, with the nut 43 being received in the slot 45b and with the shank 42 being received in the grooves 48a and 48b. The ring 10 is tightened by turning the driving nut 44 so as to move the two end portions 10a and 10b of the ring 10 towards each other.

Once tightening has been completed, the bolt 40 is prevented from rotating by means of two plates 50a and 50b that are inserted in the slots 47a and 47b. These two plates 50a and 50b make contact respectively with the threaded shank 42 and with the nut 43, and they are themselves fixed to the ring 10 by means of screws 51.

In general, it should be observed that the cable 30 (FIGS. 1 to 5) opens out into the split f over a corresponding zone in the core 12, which does not necessarily mean that the mean diameter of the loop formed by the cable 30 is less than the outside diameter of the core 12, i.e. the cable 30 is entirely received inside the core 12.

In the examples shown in FIGS. 1 to 5, the cable 30 is in fact embedded in the projecting portion 13, but the parts of the cable 30 that are level with the end portions 10a and 10b of the ring are embedded in the core 12 which has an extension E provided for this purpose. The same applies to the example shown in FIGS. 6 and 7, where the slots 45a, 47a, and 45b, 47b that receive the bolt 40 are formed in the extension E on the core 12.

To tighten the ring 10 onto the rim 3, the nut 44 is turned so as to move the two end portions 10a and 10b of the ring towards each other. In the above examples, the wedge 25 is described as being made of the same material as the projecting portion 13 of the ring. In a variant, the wedge 25 could be made of a more flexible rubber that is integrated into the projecting portion 13 during the molding process.

We claim:

1. A ring device in combination with a vehicle tire to be mounted on a vehicle rim having a well, said ring device comprising:

an abutment lip for contacting the well of the rim and securing a bead of the tire;

a wedge diametrically opposing said abutment lip for contacting said rim and for subjecting an opposing force upon another bead of the tire wherein said wedge contacts said bead of the tire when said tire is in an inflated as well as a less than fully inflated position;

said ring being a single piece of material which contains a split on its circumference so as to present two end portions that are moveable to each other;

a core comprising said abutment lip and having an inner peripheral surface configured to come into contact with the rim; and an annular projecting portion comprising said wedge and being integral with said core and having an outer peripheral surface forming the outer surface of the ring so that when the tire is deflated partially or totally, the ring device enables the vehicle to continue to operate.

2. A ring device according to claim 1, further comprising a mechanical fastener holding together the end portions of said ring, said fastener being designed to tighten the ring onto the vehicle rim.

3. A ring device according to claim 1, wherein said abutment lip for holding a bead of the tire is integral with the core of the ring and is made of the same material as the core.

4. A ring device according to claim 1, wherein said wedge designed to exert an opposing force in another bead of the tire is integral with the annular projecting portion and is made of the same material as said annular projection portion.

5. A combination of a ring device and vehicle rim for a vehicle wheel, said ring device being adapted to fit within a tubeless tire mounted on said vehicle rim having a well and to extend over at least a fraction of the shape of the rim, such that the outer surface of the ring device is at a distance from the inner surface of the tire tread when the tire is in its normal operating condition and when the tire is deflated partially or totally, the ring enables the vehicle to continue to operate, the ring device comprising:

an abutment lip for contacting the well of the rim and holding a bead of the tire;

a wedge on the diametrical face of the ring device opposite that which carries said abutment lip for subjecting force upon another bead of the tire;

said ring being constituted by a single piece of material which contains a split at a point on its circumference so as to present two end portions that are movable relative to each other;

said ring including a core of composite material based on a reinforced thermoplastic resin, the inner peripheral surface of the core being designed to come into contact with the rim, and an annular projecting portion of rubber being bonded to the core, the outer peripheral surface of the projecting portion forming the outer surface of said ring;

a mechanical fastener holding together the end portions of said ring, said fastener being designed to tighten the ring onto the rim of the wheel; and wherein said wedge designed to exert opposing force on another bead of the tire is integral with said annular projecting portion and is made of the same material, said wedge contacting the rim of said vehicle wheel.

6. A ring device according to claim 5, wherein the projecting portion is made of a rubber manufactured from very tough polyisoprene having hardness of about 70 on the Shore A scale.

7. A ring device according to claim 5, wherein said abutment lip for holding a bead of the tire is integral with the core of the ring and is made of the same material as the core.

8. A ring device according to claim 5, wherein the mechanical means for fastening the end portions of the ring together are constituted by a cable embedded with said ring and by fastening and tightening means for the two free ends of the cable which project into the split of the ring serving to move them apart or together.

9. A ring device according to claim 8, wherein the fastening and tightening means are constituted by two externally-threaded sleeves having respective oppositely-handed threads and crimped to respective ones of the two free ends of the cable, and by a nut having complementary threads screwed onto the two sleeves and designed to move them towards each other or away from each other depending on the direction of rotation imparted to the nut.

10. A ring device according to claim 9, wherein the fastening means are generally situated in a slot which extends on either side of the split in the ring.

11. A ring device according to claim 10, wherein the slot is a central slot which opens out into the outer peripheral surface of the ring.

12. A ring device according to claim 10, wherein the slot opens out into two lateral faces of the ring.

13. A ring device according to claim 5, wherein the mechanical fastener for the end portions of the ring is constituted by a bolt having a head, a threaded shank, a nut screwed onto the shank, and a driving nut secured to the shank.

14. A ring device according to claim 13, wherein the head and the nut are received in slots provided in respective ones of the end portions of the ring.

15. A ring device according to claim 14, wherein the slots are formed in the core of the ring.

* * * * *